United States Patent [19]

Omori

[11] Patent Number: 5,104,274
[45] Date of Patent: Apr. 14, 1992

[54] CAP HAVING ANTITHEFT LOCK FOR FASTENING MEMBER

[75] Inventor: Shigeru Omori, Osaka, Japan

[73] Assignee: Kyo-Ei Industrial Corporation, Osaka, Japan

[21] Appl. No.: 608,445

[22] Filed: Nov. 2, 1990

[30] Foreign Application Priority Data

Nov. 7, 1989 [JP] Japan .................. 1-130075
Dec. 25, 1989 [JP] Japan .................. 1-149628

[51] Int. Cl.⁵ .............................. F16B 19/00
[52] U.S. Cl. .................. 411/374; 411/429
[58] Field of Search ......... 411/374, 371, 372, 910, 411/373, 429, 431

[56] References Cited

U.S. PATENT DOCUMENTS

| | | | |
|---|---|---|---|
| 3,279,838 | 10/1966 | Hamilton | 411/910 X |
| 4,574,602 | 3/1986 | Furuse | 411/910 X |
| 4,880,344 | 11/1989 | Henry et al. | 411/429 X |

FOREIGN PATENT DOCUMENTS 2595125 9/1987 France .................. 411/373

Primary Examiner—Rodney M. Lindsey
Attorney, Agent, or Firm—Armstrong, Nikaido, Marmelstein, Kubovcik & Murray

[57] ABSTRACT

A cap having an antitheft lock for a fastening member and comprising a cap body (1) covering a polygonal engaging portion of the fastening member (A) and having a cavity (2) formed in the front end face of a side portion thereof, a bore (3) extending from the cavity (2) rearward therethrough and an inward slanting guide face (4) formed in the inner periphery of the cap body (1) and extending from the bore (3) toward the rear end of the cap body, a pressure contact piece (7) having an outward slanting face (6) positioned inwardly of and opposed to the inward slanting face (4) for preventing the cap from slipping off, and a screw (5) inserted through the cavity (2) into the bore (3) and having a rear end screwed into the contact piece (7) and a head (5a) bearing on the bore edge portion. The outward slanting face (6) is slidable along the inward slanting face (4) to move the contact piece (7) axially and radially of the cap body simultaneously by rotating the screw (5) relative to the contact piece (7) in the driving-in or loosening direction.

5 Claims, 7 Drawing Sheets

CAP HAVING ANTITHEFT LOCK FOR FASTENING MEMBER

BACKGROUND OF THE INVENTION

The present invention relates to caps having an antitheft lock for fastening members, such as bolts or nuts, having a polygonal engaging portion, and more particularly to a cap having a noval structure and equipped with a lock for preventing a motor vehicle wheel or battery or a lamp on the roof of a four-wheel drive motor vehicle or like part from being stolen by a third party who stealthily loosens the bolt or nut fastening the part.

The term "front" as used herein refers to the left-hand side of FIG. 1 which is closer to the worker when he removes the cap from the nut or attaches the cap thereto, and the other side is referred to as the "rear."

DESCRIPTION OF THE PRIOR ART

Antitheft devices for motor vehicle wheels generally comprise a wheel attaching nut screwed on the hub bolt or a wheel attaching bolt screwed on a male screw portion of the hub, and a cap having a lock and attached to and covering the polygonal engaging portion of the nut or bolt.

FIG. 21 shows such a cap heretofore known. The body 53 of the cap is fitted over the polygonal engaging portion of a wheel attaching nut 51 having a cavity 52 in its front end. The front end of the cap body 53 is rotatably provided with a lock 54, which has side ridges 55 engaged in furrows 56 formed in the inner periphery of the nut 51 defining its cavity 52 to prevent removal of the cap body 53 from the nut 51. The cap body 53 is removable by rotating the lock 54 relative to the nut 51 with a special key 57 and thereby disengaging the ridges 55 of the lock 54 from the cavity furrows 56.

However, the antitheft device has the drawback that it is usable only for nuts having a cavity in the front end for the prevention of theft but is not usable for those having no cavity in the front end.

In view of the above situation, the main object of the present invention is to provide a cap having an antitheft lock and usable for fastening members of any type, such as wheel attaching nuts.

SUMMARY OF THE INVENTION

To fulfill the above object, the present invention provides a cap having a lock and comprising a cap body 1 covering a polygonal engaging portion of a fastening member A and having a cavity 2 formed in the front end face of a side portion thereof, a bore 3 extending from the cavity 2 rearward therethrough and an inward slanting guide face 4 formed in the inner periphery of the cap body 1 and extending from the bore 3 toward the rear end of the cap body, a pressure contact piece 7 having an outward slanting face 6 positioned inwardly of and opposed to the inward slanting face 4 for preventing the cap from slipping off, and a screw 5 inserted through the cavity 2 into the bore 3 and having a rear end screwed into the pressure contact piece 7 and a head 5a bearing on the bore edge portion, the outward slanting face 6 being slidable along the inward slanting face 4 to move the pressure contact piece 7 axially and radially of the cap body at the same time by rotating the screw 5 relative to the pressure contact piece 7 in the driving-in or loosening direction.

The inward slanting face 4 of the cap body 1 may be a slanting face facing obliquely rearwardly inward or a slanting face facing obliquely forwardly inward. In the former case, the outward slanting face 6 of the pressure contact piece 7 is a slanting face facing obliquely forwardly outward, and the contact piece 7 is moved axially forward and, at the same time, radially inward by rotating the screw 5 relative to the piece 7 in the driving-in direction. In the latter case, the outward slanting face 6 of the contact piece 7 is a slanting face facing obliquely rearwardly outward, and the contact piece 7 is moved axially rearward and radially inward simultaneously by rotating the screw 5 relative to the piece 7 in the loosening direction. In the latter case, a stopper is provided for preventing the screw 5 from moving forward when it is rotated in the loosening direction.

Preferably according to the present invention, an elastic member 9 or 11 is provided between the contact piece 7 and the cap body 1 for biasing the piece 7 and the screw 7 forward. The elastic member to be used is, for example, a wire spring or coiled spring. The cap of the present invention may be provided at its front end with a mudguard face cover 12 for concealing the screw 5. The face cover 12 is preferably openable or rotatable relative to the front end face of the cap body 1.

The head 5a of the screw 5 may have an engaging recess 10 formed in its front side and a projection 36 provided in the recess 10 for preventing engagement of a driver or the like.

Aside from the cavity 2, cap body 1 may have a cavity or through bore 30 formed in a front side portion thereof and provided with an engaging inner flange 31.

The cap having a lock and embodying the invention has the above construction and is therefore very conveniently usable for any fastening members such as wheel attaching nuts. Accordingly, the cap is adapted to reliably prevent a motor vehicle wheel or battery or a lamp on the roof of a four-wheel drive motor vehicle or like part from being stolen by a third party who furtively loosens the bolt or nut fastening the part.

When the cap is provided with the face cover 12 over its front end, the face cover 12 prevents the ingress of mud into the cavity 2 having the head 5a of the screw 5 accommodated therein. In the case where the face cover 12 is rotatable relative to the cap body 1, the face cover 12, which usually conceals the cavity 2 having the head 5a of the screw 5 accommodated therein, is turned to register a peripheral hole 24 with the screw 5 when the cap is to be unlocked or locked.

In the case where the head 5a of the screw 5 has the engaging recess 10 in its front side and the projection 36 in the recess, a usual driver, if used for unlocking the cap, is not engageable in the recess 10 by being interfered with by the projection 36, thus making it difficult for a third party to stealthily loosen the bolt or nut and steal the part thereby attached.

Further when the cap body 1 is provided with the cavity or through bore 30 having the engaging inner flange 31 other than the cavity 2 in the front side portion thereof, and in the case where the cap is not removable from the bolt or nut directly with the finger, the face cover 12 is turned relative to the bottom wall 1a of the cap body to register the peripheral hole 24 with the cavity or through bore 30, and a special key is inserted into the cavity or through bore 30 to engage a jaw portion 32 of the key with the inner flange 31 and is then pulled, whereby cap can be removed free of trouble.

BRIEF DESCRIPTION OF THE DRAWINGS

FIGS. 1 and 4 are views in vertical section of the embodiment, i.e., a cap;
FIG. 2 is a front view of the cap;
FIG. 3 is a rear view of the cap;
FIG. 7 is a front view partly broken away and showing the cap;
FIG. 8 is a rear view of the cap;
FIG. 9 is a view in section taken along the line IX—IX in FIG. 7;
FIG. 10 is a view in section taken along the line X—X in FIG. 7;
FIG. 11 is a front view partly broken away and showing the cap;
FIG. 12 is a rear view of the cap;
FIG. 13 is a view in section taken along the line XIII—XIII in FIG. 11;
FIG. 14 is a view in section taken along the line XIV—XIV in FIG. 11;
FIG. 15 is a view in vertical section of the cap;
FIG. 16 is a view in section taken along the line XVI—XVI in FIG. 15;
FIG. 17 is a view in section taken along the line XVII—XVII in FIG. 15;
FIG. 18 is a view in section taken along the line XVIII—XVIII in FIG. 15;
FIG. 19 is a front view of the cap;
FIG. 20 is a view in section taken along the line XX—XX in FIG. 19.

DETAILED DESCRIPTION OF EMBODIMENTS

Figure 1:
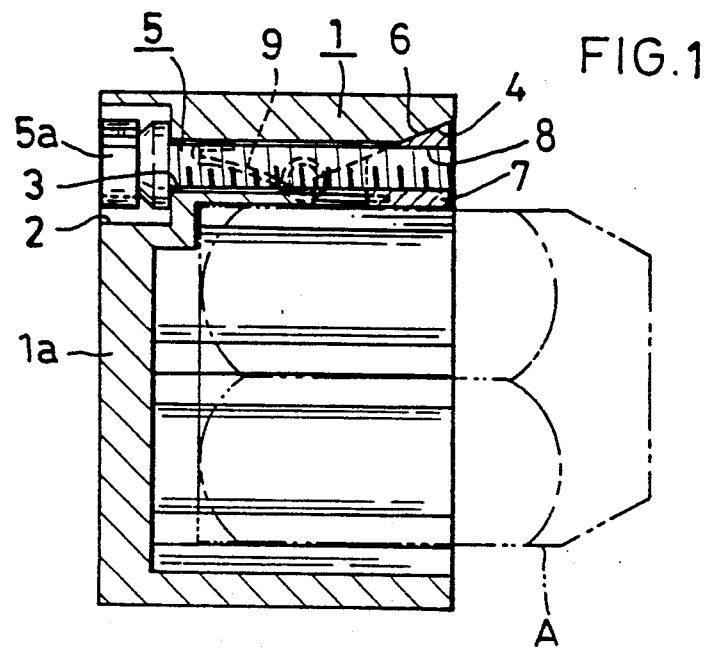
FIGS. 1 to 4 show a first embodiment.
Figure 2:
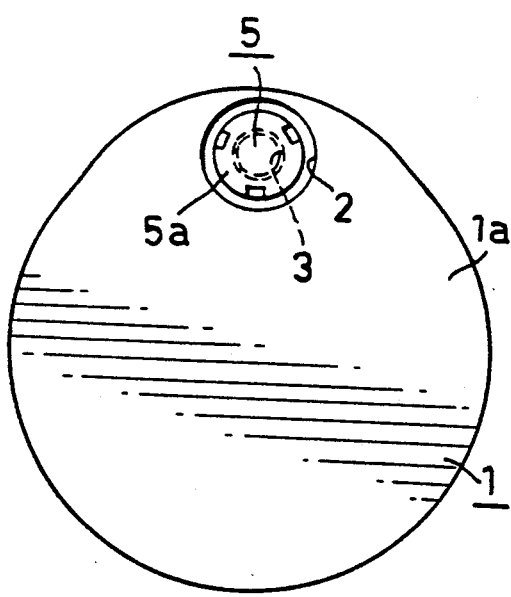
Figure 3:
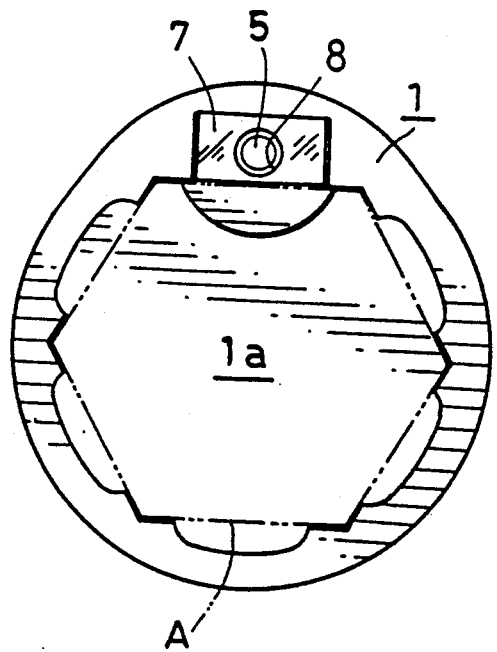
Figure 4:
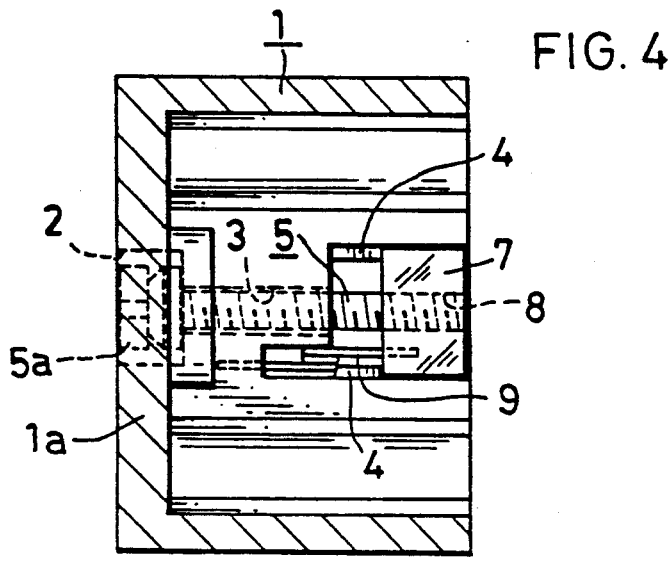

The present invention will be described below in detail with reference to the illustrated embodiments.

Referring to FIGS. 1 to 4, a cap body 1 is generally in the form of a hollow cylinder having a bottom wall 1a at its front end and has an inner periphery which is regular hexagonal in cross section in conformity with the hexagonal engaging portion of a wheel attaching nut A. At a side portion of the cap body 1, a cavity 2 open toward the front is formed in the front end of the body, i.e., in a bottom wall 1a. A bore 3 extends from the cavity 2 rearward through the body axially thereof. The rear portion of the bore 3 has an inward slanting face 4 formed in the inner periphery of the cap body 1 and facing obliquely rearwardly inward.

A screw 5 is inserted through the cavity 2 into the bore 3. A pressure contact piece 7 in the form of a block and separate from the cap body 1 is disposed inside the inward slanting face 4 for preventing the cap from slipping off. The contact piece 7 has a threaded hole 8 axially of the bore 3, and the rear end of the screw 5 is screwed into the threaded hole 8. The pressure contact piece 7 is formed on its outer side with an outward slanting face 6 facing obliquely forwardly outward and slidable along the inward slanting face 4. The contact piece 7 is movable axially forward and, at the same time, radially inward by rotating the screw 5 relative to the contact piece 7 in the driving-in direction.

Interposed between the front end of the contact piece 7 and the rear side of the cavity portion 2 of the cap body 1 is a wire spring 9 for biasing the piece 7 and the screw 5 rearward. The head 5a of the screw 5 is held accommodated in the cavity 2 at all times by the spring 9.

The cap having an antitheft lock and embodying the invention has the above construction for preventing the theft of the nut A.

The cap is locked by fitting the cap body 1 over the polygonal engaging portion of the wheel attaching nut A, then engaging a projecting portion of a key possessed by a specified person with the head 5a of the screw 5 and driving the screw 5 into the pressure contact piece. The key projecting portion is shaped in conformity with the special configuration of the head 5a. Consequently, the pressure contact piece 7 is moved axially forward with its outward slanting face 6 in sliding contact with the inward slating face 4 of the cap body 1, whereby the piece 7 is moved radially inwardly of the cap body into pressing contact with the outer surface of the nut A. The cap is unlocked by rotating the screw 5 in a direction opposite to the above, i.e., in the loosening direction, relative to the contact piece 7 using the key. As a result, the contact piece 7 is moved axially rearward and radially outward at the same time and is thereby brought out of contact with the outer surface of the nut A.

Figure 5:
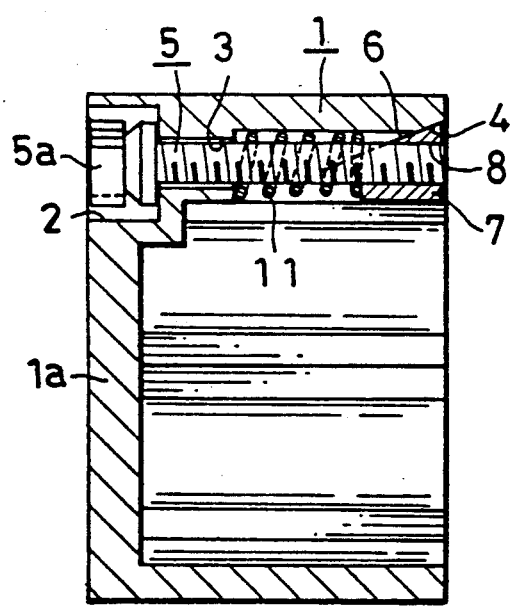
FIGS. 5 and 6 are views in vertical section showing another cap as a second embodiment.
Figure 6:
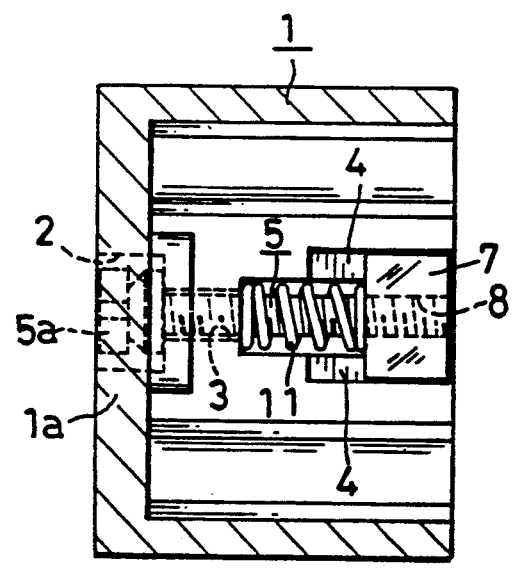
Figure 7:
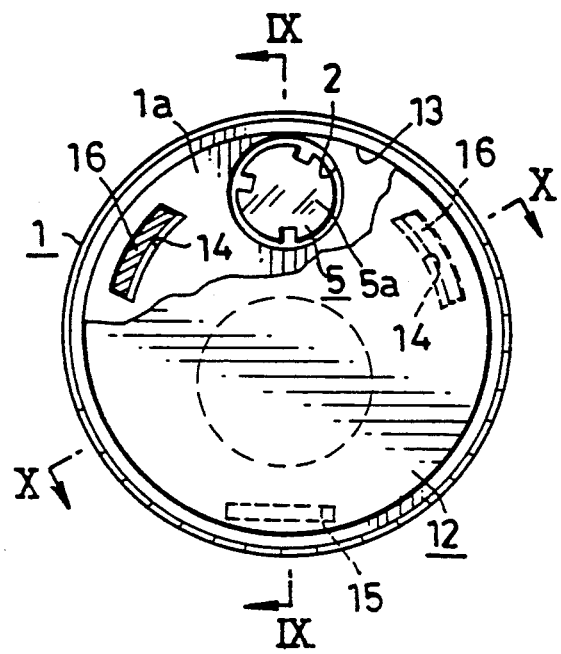
FIGS. 7 to 10 show another cap as a third embodiment.
Figure 8:
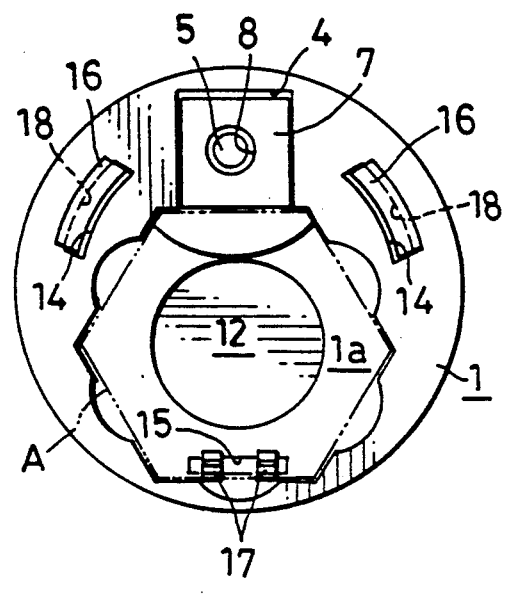
Figure 9:
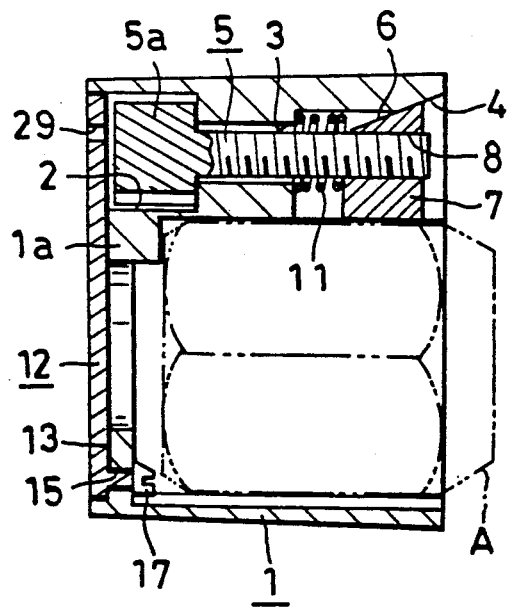
Figure 10:
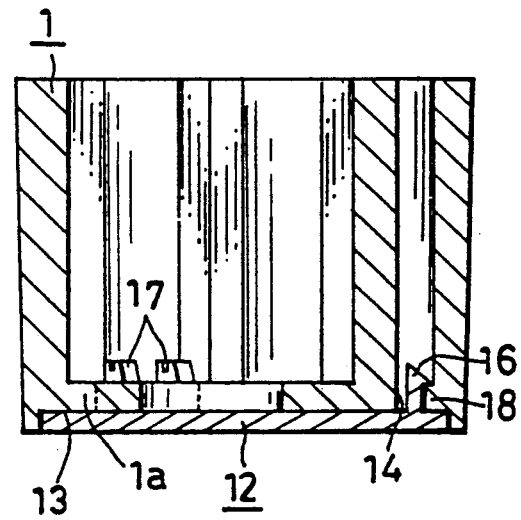
Figure 11:
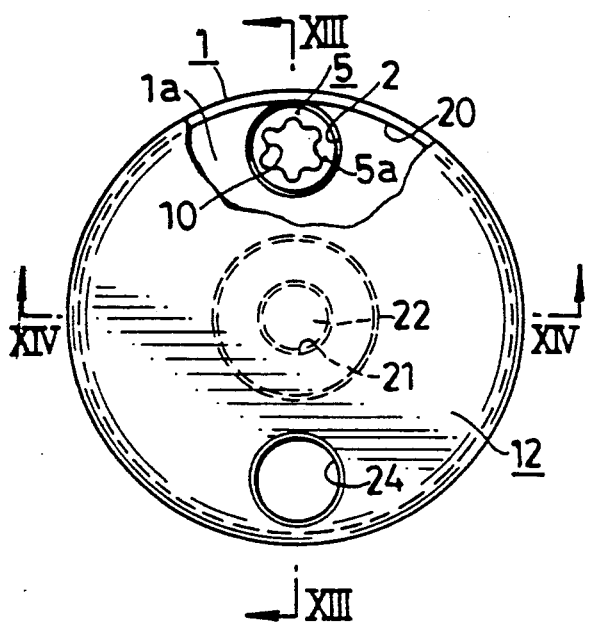
FIGS. 11 to 14 show another cap as a fourth embodiment.
Figure 12:
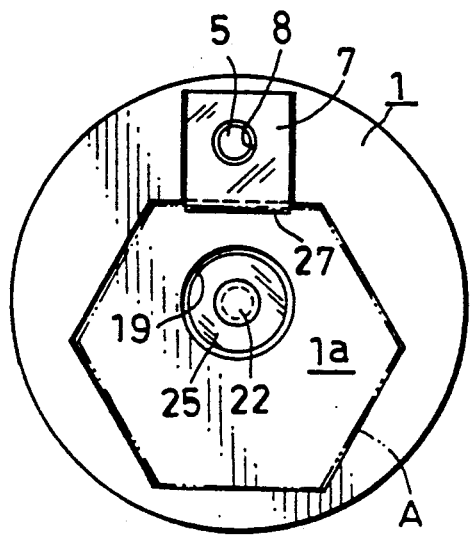
Figure 13:
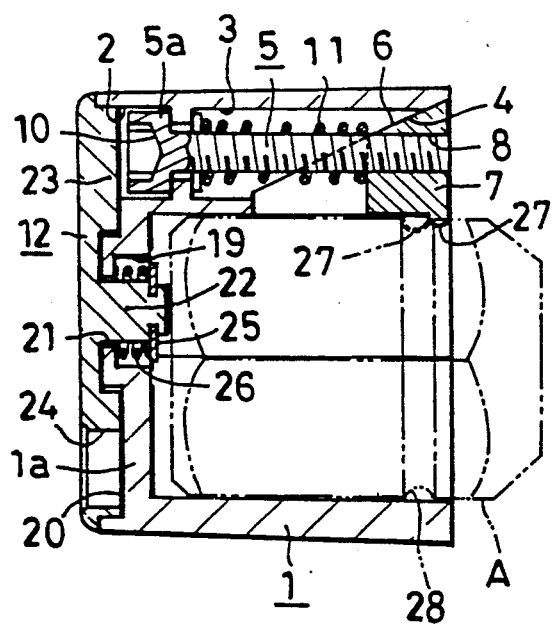
Figure 14:
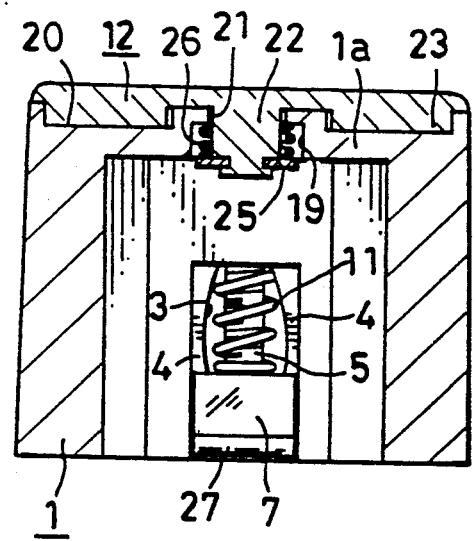
Figure 15:
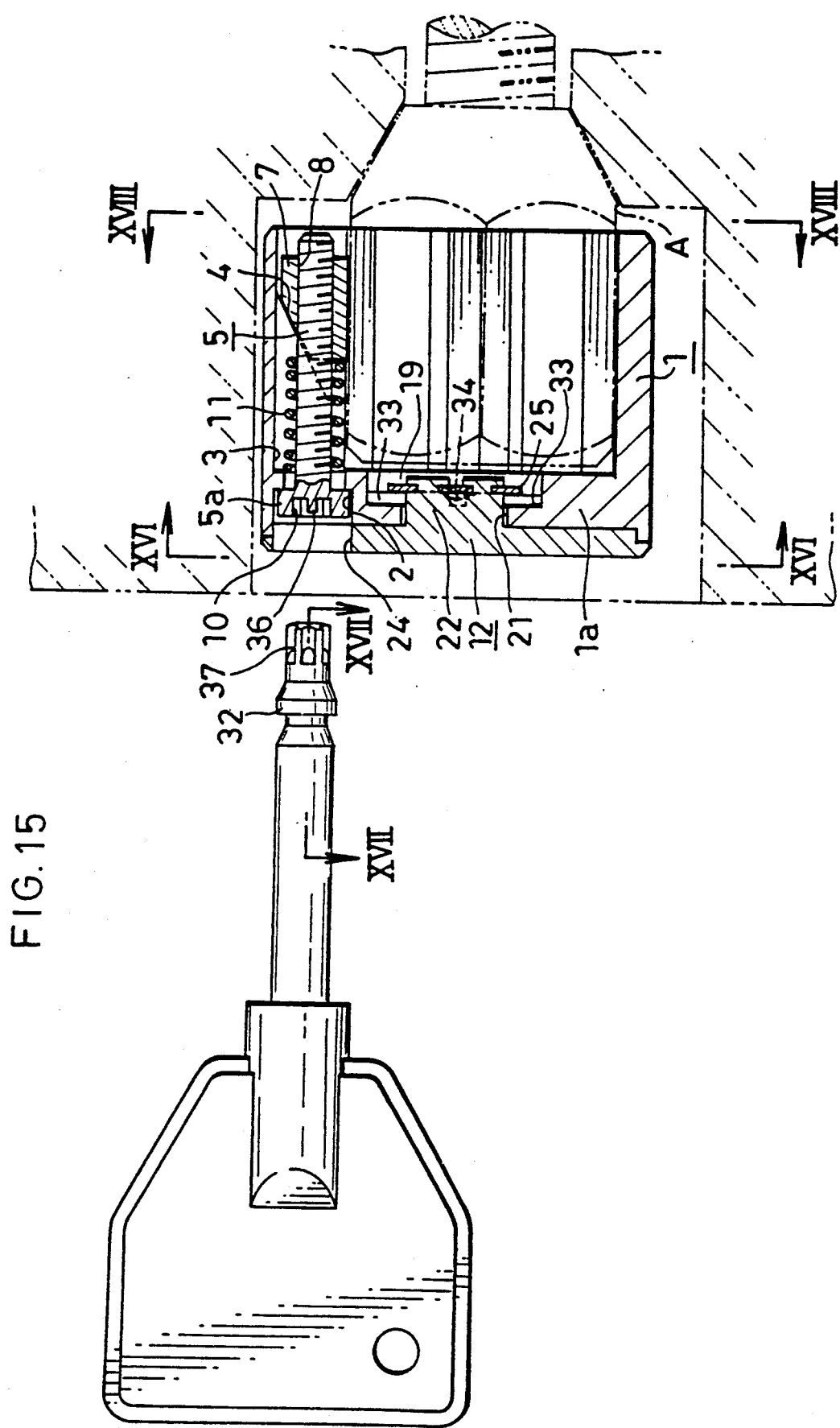
FIG. 15 to 20 show another cap as a fifth embodiment.

FIGS. 5 and 6 show another embodiment, in which a coiled spring 11 is used in place of the wire spring 9 included in the embodiment of FIGS. 1 to 4. The spring 11 is wound around the screw 5 and interposed between the front end of the pressure contact piece 7 and the rear side of the cavity portion 2 of the cap body 1.

FIGS. 7 to 10 show another embodiment, wherein a mudguard face cover 12 for concealing the screw 5 is provided on the front end of the cap body 1.

More specifically, the bottom wall 1a of the cap body 1 has in its front surface a recess 13 for the face cover 12 to fit in. The cavity 2 of the cap body 1 is formed in the bottom of the recess 13. The front face the head 5a of the screw 5 is exposed at the bottom of the recess 13. At opposite sides of the screw 5, slots 14, circular-arc in cross section, extend through a thick wall portion of the cap body 1 from the bottom of the recess 13 to the rear end of the cap body. The bottom wall 1a has an inward projection 18 at the front end of each slot 14. At one side of the bottom of the recess 13 opposite to the screw 5, a slit 15 is formed in the bottom wall 1a in communication with the interior of the cap body 1.

On the other hand, the face cover 12 is formed on its rear side with outward claws 16 circular-arc in cross section and positioned in corresponding relation with the respective slots 14, and with a pair of hooks 17 positioned in corresponding relation with the slit 15. The face cover 12 has a driver insertion hole 29 as positioned in corresponding relation with the screw 5.

The face cover 12 is attached to the cap body 1 by positioning the cover 12 in register with the recess 13 and forcing the pair of hooks 17 into the slit 15. With the outward claws 16 removably in engagement with the inward projections 18 in the slots 14, the face cover 12 conceals the screw 5.

According to the present embodiment, the claws 16 are removed from the slots 14 with a driver inserted into the hole 29 to open the face cover 12 and expose the head 5a of the screw 5 before the cap is to be locked or unlocked. After locking, the face cover 12 is fitted into the recess 13 to conceal the screw 5. The face cover 12 therefore prevents ingress of mud into the cavity 2 which has the screw head 5a accommodated therein.

FIGS. 11 to 14 show another embodiment, in which the front end of the cap body 1 is also provided with a mudguard face cover 12 for concealing the screw 5.

More specifically, the bottom wall 1a of the cap body 1 has a central recess 19 in the center of its rear side, an annular groove 20 in its front side along the periphery, and a central hole 21 formed in the center and communicating with the central recess 19.

On the other hand, the face cover 12 has a stud 22 projecting rearward from the center of its rear surface and fitting in the central recess 19, and an annular protrusion 23 formed on the rear surface along its periphery and shaped in conformity with the peripheral annular groove 20 of the cap body 1. A peripheral hole 24 of required size is formed in the peripheral annular protrusion 23.

The stud 22 of the face cover 12 is inserted through the central hole 21 of the bottom wall 1a from the front. A retainer 25 is secured to the inserted end of the stud 22. A coiled spring 26 provided around the stud 22 is held in the central recess 19 by the retainer 25.

Thus according to this embodiment the face cover 12 concealing the screw 5 is rotatably attached to the bottom wall 1a of the cap body 1. When the cap is to be locked or unlocked, the face cover 12 is rotated relative to the bottom wall 1a to position the peripheral hole 24 in register with the screw 5 and expose the head 5a of the screw 5. After locking or unlocking, the face cover 12 is turned to conceal the screw 5 again. In this way, the face cover 12 prevents mud from ingressing into the cavity 2 having the screw head 5a accommodated therein.

With the present embodiment, the inner surface of the pressure contact piece 7 has a ridge 27 extending circumferentially of the cap, while the nut A is formed with a furrow 28 in the periphery of its rear end. When the contact piece 7 is brought into pressing contact with the nut A, the ridge 27 fits into the furrow 28, preventing the cap body 1 from slipping off the nut A.

FIGS. 15 to 20 show another embodiment, wherein the front end of the cap body 1 is rotatably provided with a mudguard face cover 12 for concealing the screw 5 similarly.

The bottom wall 1a of the cap body 1 has a central recess 19 formed in the center of its rear side and having radial grooves 33, and a central hole 21 formed in its center and communicating with the central recess 19.

On the other hand, the face cover 12 has a stud 22 projecting rearward from the center of its rear surface and fitting in the central recess 19, and a peripheral hole 24 of required size in a peripheral portion thereof.

The stud 22 of the face cover 12 is inserted through the central hole 21 of the bottom wall 1a from the front. A retainer 25 is secured to the inserted end of the stud 22. The retainer 25 is made of spring steel and has forward protuberances 34, which are fitted in the respective grooves 33 of the central recess 19.

With the present embodiment, the face cover 12 concealing the screw 5 is rotatably attached to the bottom wall 1a of the cap body 1. When the cap is to be locked or unlocked, the face cover 12 is rotated relative to the bottom wall 1a to position the peripheral hole 24 in register with the screw 5 and expose the head 5a of the screw 5. After the locking or unlocking procedure, the face cover 12 is rotated to conceal the screw 5 again. In this way, the ace cover 12 prevents mud from ingressing into the cavity 2 having the screw head 5a accommodated therein.

Figure 17:
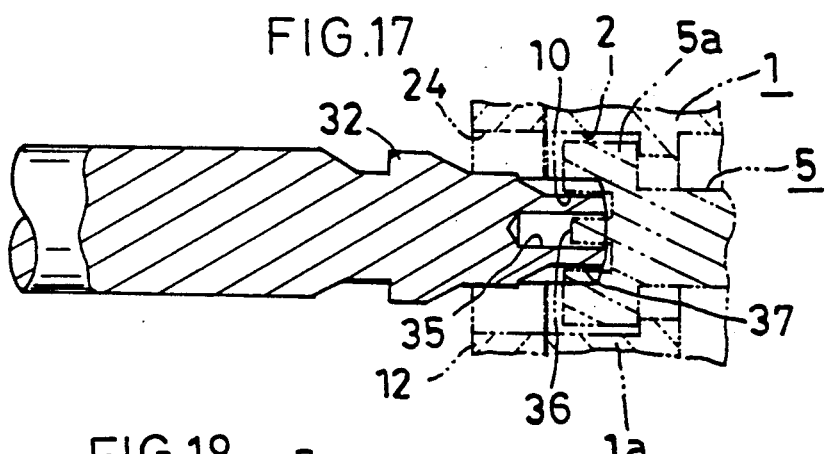
Figure 18:
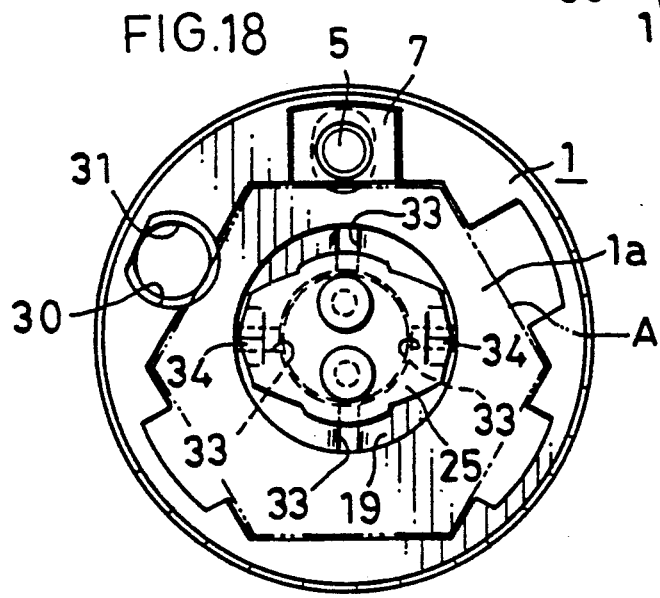

With reference to FIG. 17, the head 5a of the screw 5 has an engaging recess 10 in its front side and a projection 36 projecting forward from the bottom of the recess 10 centrally thereof for preventing engagement of a driver or the like according to the present embodiment. On the other hand, a key possessed by a specified person has an engaging projection 37 shaped in conformity with the recess 10 and a cavity 35 for the projection 36 to enter. Accordingly, a common driver, if used for unlocking the cap, is unable to engage in the recess 10 by being interfered with by the projection 36.

Figure 19:
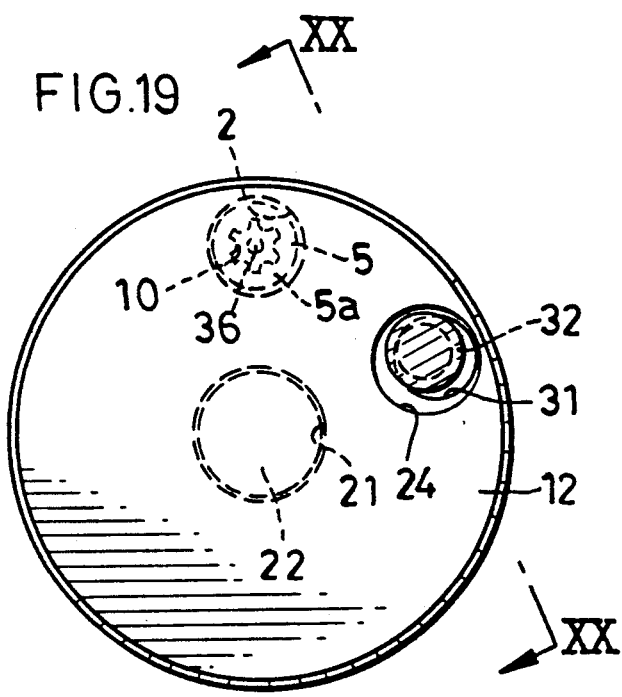
Figure 20:
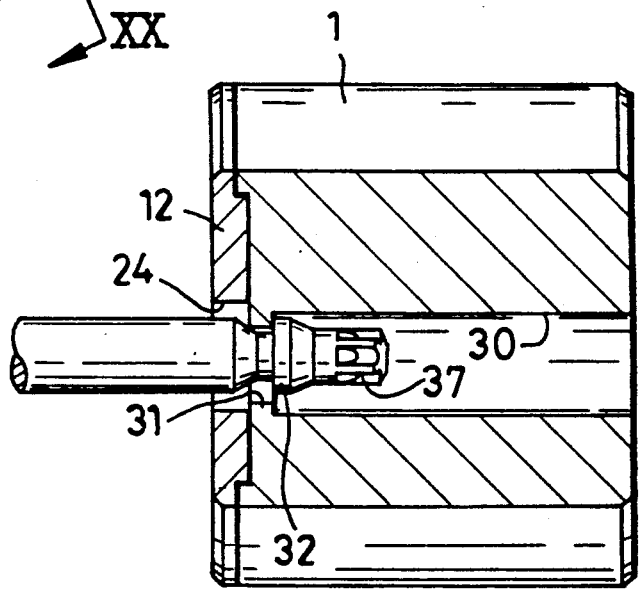
Figure 21:
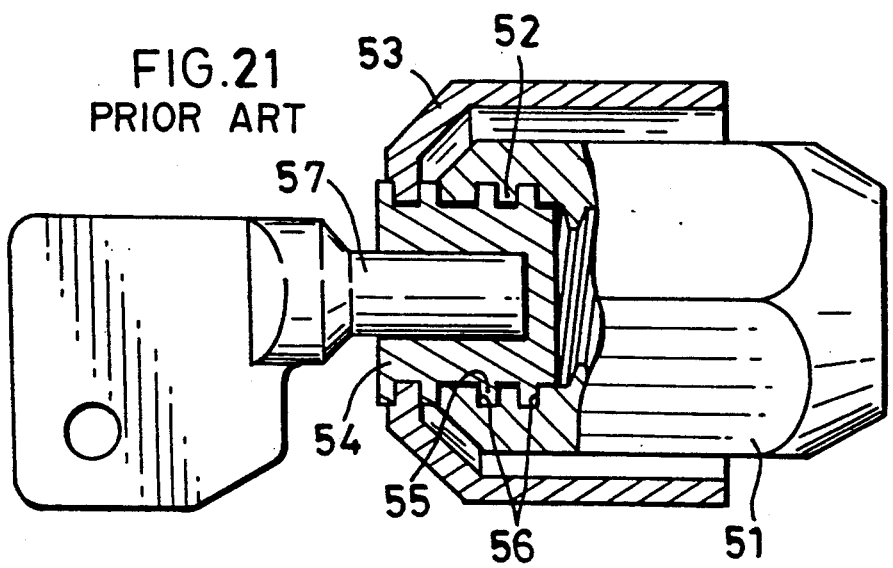
FIG. 21 is a view in vertical section of a cap of the prior art.

Further as seen in FIGS. 19 and 20, the cap body 1 of the present embodiment is formed in a side portion thereof with a through bore 30 having an engaging inner flange 31 at its front end, aside from the bore 3. The through bore 30 and the bore 3 are at equal distances from the axis of the cap body 1, i.e., from the center of the face cover 12. The cap body 1 covering the polygonal engaging portion of the nut A is removable therefrom by rotating the face cover 12 relative to the bottom wall 1a to register the peripheral hole 24 with the through bore 30, inserting the special key into the through bore 30 to engage a jaw portion 32 of the key with the inner flange 31 of the bore 30 and pulling the key.

Figure 16:
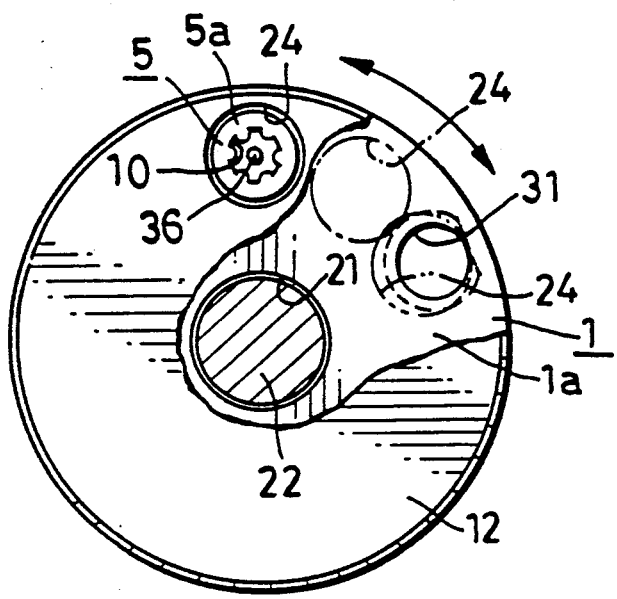

As seen in FIG. 16, the peripheral hole 24 of the face cover 12 is positioned usually between the cavity 2 and the through bore 30 so as to be in register with neither of them.

What is claimed is:

1. A cap having an antitheft lock for a fastening member, the cap comprising:
   a cap body (1) covering a polygonal engaging portion of the fastening member (A) and having a cavity (2) formed in a front end face of a side portion thereof,
   a bore (3) extending from the cavity (2) rearward therethrough and an inward slanting guide face (4) formed in the inner periphery of the cap body (1) and extending from the bore (3) toward the rear end of the cap body,
   a pressure contact piece (7) having an outward slanting face (6) positioned inwardly of and opposed to the inward slanting face (4) for preventing the cap from slipping off,
   a screw (5) inserted through the cavity (2) into the bore (3) and having a rear end screwed into the pressure contact piece (7) and a head (5a) bearing on an edge portion of the bore, and
   spring means disposed within said cap body for biasing said screw rearward,
   wherein the outward slanting face (6) is slidable along the inward slanting face (4) to move the pressure contact piece (7) axially and radially of the cap body at the same time by rotating the screw (5) relative to the pressure contact piece (7) in a driving-in or loosening direction.

2. A cap as defined in claim 1 which has a mudguard face cover (12) over its front end face.

3. A cap as defined in claim 2 wherein the face cover (12) is rotatable relative to the cap body (1).

4. A cap as defined in claim 1 wherein an engagement preventing projection (36) is formed in an engaging recess (10) formed in the front side of the head (5a) of the screw (5).

5. A cap as defined in claim 1 wherein a cavity or through bore (30) other than the cavity (2) and having an engaging inner flange (31) is formed in the front end of the cap body (1) at a side portion thereof.

* * * * *